(12) United States Patent
Coatta et al.

(10) Patent No.: US 9,565,149 B2
(45) Date of Patent: Feb. 7, 2017

(54) MEDIA MESSAGING METHODS, SYSTEMS, AND DEVICES

(71) Applicant: Brilliant Mobile, L.L.C., Chanhassen, MN (US)

(72) Inventors: Jay David Coatta, Chanhassen, MN (US); John Mikkelsen, Wayzata, MN (US); Sergey Tolkachev, Minneapolis, MN (US); Robert Freidson, Saint Petersburg (RU); Max Freidson, Saint Petersburg (RU)

(73) Assignee: Phoji, LLC, Minneapolis, MN (US)

( * ) Notice: Subject to any disclaimer, the term of this patent is extended or adjusted under 35 U.S.C. 154(b) by 285 days.

(21) Appl. No.: 14/072,418

(22) Filed: Nov. 5, 2013

(65) Prior Publication Data
US 2014/0129650 A1    May 8, 2014

Related U.S. Application Data

(60) Provisional application No. 61/722,560, filed on Nov. 5, 2012, provisional application No. 61/835,975, filed on Jun. 17, 2013.

(51) Int. Cl.
*G06F 15/16* (2006.01)
*H04L 12/58* (2006.01)

(52) U.S. Cl.
CPC ................................. *H04L 51/10* (2013.01)

(58) Field of Classification Search
CPC .......... H04L 51/10; H04L 12/58; H04L 29/06; G06Q 10/107
USPC ................ 709/204, 205, 206, 217, 218, 219
See application file for complete search history.

(56) References Cited

U.S. PATENT DOCUMENTS

| 7,035,803 | B1* | 4/2006 | Ostermann et al. .......... 704/260 |
| 2002/0137507 | A1* | 9/2002 | Winkler ................ H04L 12/583 455/412.1 |
| 2006/0053386 | A1* | 3/2006 | Kuhl ...................... G06F 3/0236 715/773 |
| 2006/0129633 | A1* | 6/2006 | Potluri et al. ................. 709/203 |
| 2007/0203995 | A1* | 8/2007 | Wang et al. .................. 709/206 |

(Continued)

FOREIGN PATENT DOCUMENTS

| KR | 10-2005-0037070 | 4/2005 |
| KR | 10-0680034 | 2/2007 |

(Continued)

OTHER PUBLICATIONS

"Notification of Transmittal of the International Search Report and the Written Opinion of the International Searching Authority, or the Declaration" for PCT/US2013/035209 filing date Nov. 5, 2013, 4 pages.

(Continued)

*Primary Examiner* — Liangche A Wang
*Assistant Examiner* — Kaylee Huang
(74) *Attorney, Agent, or Firm* — Patterson, Thuente, Pedersen, P.A.

(57) ABSTRACT

A wireless communications system that allows a mobile phone, tablet or personal computer user the ability to initiate the sending of a text message or email whereby the sender is able to include photographs, graphs, pie charts and the like within the flow of the actual word by word texting or email writing process, without depending on the traditional necessary step to "attach" the photograph.

13 Claims, 14 Drawing Sheets

(56) References Cited

U.S. PATENT DOCUMENTS

| | | | |
|---|---|---|---|
| 2007/0266090 A1* | 11/2007 | Len | G06F 17/211 709/204 |
| 2008/0285071 A1 | 11/2008 | Mori et al. | |
| 2009/0055484 A1* | 2/2009 | Vuong et al. | 709/206 |
| 2009/0156170 A1* | 6/2009 | Rossano et al. | 455/412.1 |
| 2013/0012245 A1* | 1/2013 | Choi | H04M 3/42382 455/466 |
| 2014/0101553 A1* | 4/2014 | Nagel | G06F 3/0482 715/728 |
| 2014/0143330 A1* | 5/2014 | Shaw | G06Q 50/01 709/204 |

FOREIGN PATENT DOCUMENTS

| | | |
|---|---|---|
| KR | 10-2009-0057655 | 6/2009 |
| WO | WO 2004/017596 | 2/2004 |

OTHER PUBLICATIONS

International Preliminary Report on Patentability from PCT Application PCT/US2013/068509, dated May 14, 2015, 8 pgs.

\* cited by examiner

MEDIA MESSAGING METHODS, SYSTEMS, AND DEVICES

CLAIM TO PRIORITY

This application claims the benefit of U.S. Provisional Patent Application 61/772,560 entitled "RMS Communication Service" filed Nov. 5, 2012, and U.S. Provisional Patent Application 61/835,975 entitled "Reach Messaging Methods, System, and Service" filed Jun. 17, 2013, each of which is incorporated herein by reference.

TECHNICAL FIELD

This application relates generally to electronic device communication, and more particularly, to systems, methods, and devices for the insertion of media data within electronic device communication.

BACKGROUND

In a traditional texting or messaging environment, in order to insert media data other than text, a user must go through a cumbersome process of attaching the media data, select the media data through a series of menus, or otherwise go through similar cumbersome processes of attaching the media data. Further, such inserted data is typically generic and impersonal to the users.

Therefore, there is a need for a messaging system that optimizes the information power of the communication process between users and further adds a personal feeling and experience, which in turn, substantially increases the amount of information per message.

SUMMARY

Embodiments of the present application substantially meet the aforementioned needs of the industry. In an embodiment, a Media Messaging Platform (MMP) is a cloud-based communication platform, allowing mobile and tablet users to seamlessly integrate texts, images, photographs audio and video (Rich Media Data) within texting and messaging interactions with correspondents without having to interrupt the mobile user's texting flow skipping the laborious "step" of "attaching" such rich media data into a mobile user's message.

In embodiments, MMP provides users with a semantically organized multi-dimensional communication space for personalizing rich media content (for example, images, photographs, audio, video, etc.) and integrating the content into a more emotionally enriched communication experience between MMP users.

In embodiments, MMP can include a set of tools for content organization and integration of such personalized rich media content within mobile related texts, chats and email communications.

In embodiments, MMP's "Content Organizer" visually presents Rich Media Data Objects in the form of unique icons called "Photocons" or "Phoji's." Photocons and Phojis are real photos of faces, brands, logos, animals and any other true photographic images (although the MMP shortcuts and "Content Organizer" can also be used with traditional non-photographic emojis or emoticons, as discussed below).

According to embodiments, a wireless communications platform allows a mobile phone, tablet or personal computer user the ability to initiate the sending of a text message or email whereby the sender is able to include photographs, graphs, pie charts and the like within the flow of the actual word by word texting or email writing process, without depending on the traditional necessary step to "attach" said photograph (graph, pie chart and the like) as is currently experienced with all existing texting and email platforms.

As the user types email or text message, user is able to incorporate photographs, graphs, pie charts and the like by tapping on, clicking on or dragging existing photographs stored on the user's device. User also having the option to use "qwerty symbol short-cuts" like the exclamation point, colon, semi colon and the like which are pre-assigned by user to user-identified photographs, pie charts, graphs and the like, giving user the ability to instantly "shortcut" the inclusion of said photographs, images, pie charts graphs and the like within the user's texting flow experience.

For example, user is writing an email explaining with words a particular "financial ownership break down." Rather than the user attaching an image of a "pie chart graph" to the bottom of the email (which must then be opened by receiver separately taking reader away from text), the user (sender) can simply type "!pc" within the flow of their email typing and the image of said "pie chart graph" will automatically "place itself within the paragraph of the words being typed, the symbol "!pc" having been pre-assigned to said image of "pie chart graphic" within user's device or photograph library.

A similar example can be made within a text messaging experience between users in a chat or texting experience. For example, the platform user can type a text message to a friend explaining, "We won the game!" Traditional texting platforms allow a user to add small, animated "smiley faces," "sad faces," "heart symbols" and the like. These "non-rich media icons" have come to be known worldwide as ubiquitous yellow "smileys," otherwise known as "emoticons" or "emojis." These small animated icons are not real photographs or real images, yet add to the expression of texted words within a given message's context.

According to embodiments, the platform allows the user to send the same expressive text message, "We won the game!" adding a real photograph of say the team cheering, or the individual smiling. Thus the emotional experience by the receiver of the text message is far more personal as it is a photo of the actual person who just "won the game" rather than a "small yellow smiley face" which may or may not represent the truest nature of the text message.

A text message might be sent reading, "Let's have a beer . . . " The sender typing the symbol "!beer" allowing the pre-assigned photograph of a tall cold mug of beer to follow the text message without the extra step of "attaching" said photograph. User can insert or otherwise couple an unlimited number of photographs within the texting cell, which cannot be accomplished by "attaching photos" within the traditional texting experience.

In an embodiment, a communications system comprises a first user device presenting a first user interface; a second user device presenting a second user interface; a messaging cloud including: at least one database of rich media data, a messaging service configured to: receive a message, the message including a rich media data request from the first user, retrieve the requested rich media data from the at least one database of rich media data, insert the retrieved rich media data into the message, and present the message to the second user device via the second user interface; and a network operably coupling the first user device, the second user device, and the messaging cloud, wherein the message is originally formatted on the first user device via the first user interface such that the rich media data request is within the message.

In an embodiment, a method of streamlined media insertion on an electronic device comprises initiating, by the electronic device, a messaging session with a receiving user; receiving a message on the electronic device, the message including at least one media insertion request; evaluating the at least one media insertion request; retrieving media from at least one database of media based on the evaluated at least one media insertion request; and inserting the retrieved media into the message.

In an embodiment, a wireless device in electronic communication with a messaging service along a wireless network, the messaging service configured to evaluate at least one media insertion request, retrieve media from at least one database of media based on the evaluated at least one media insertion request, insert the retrieved media into the message, and present the message to a receiving user, the wireless device comprises a memory; and a processor in electronic communication with the memory, the processor configured to: initiate a messaging session with a receiving user, receive a message including at least one media insertion request, and transmit the message to the messaging service.

The above summary of the invention is not intended to describe each illustrated embodiment or every implementation of the present invention. The figures and the detailed description that follow more particularly exemplify these embodiments.

BRIEF DESCRIPTION OF THE DRAWINGS

The invention may be more completely understood in consideration of the following detailed description of various embodiments of the invention in connection with the accompanying figures, in which.

Figure 1:
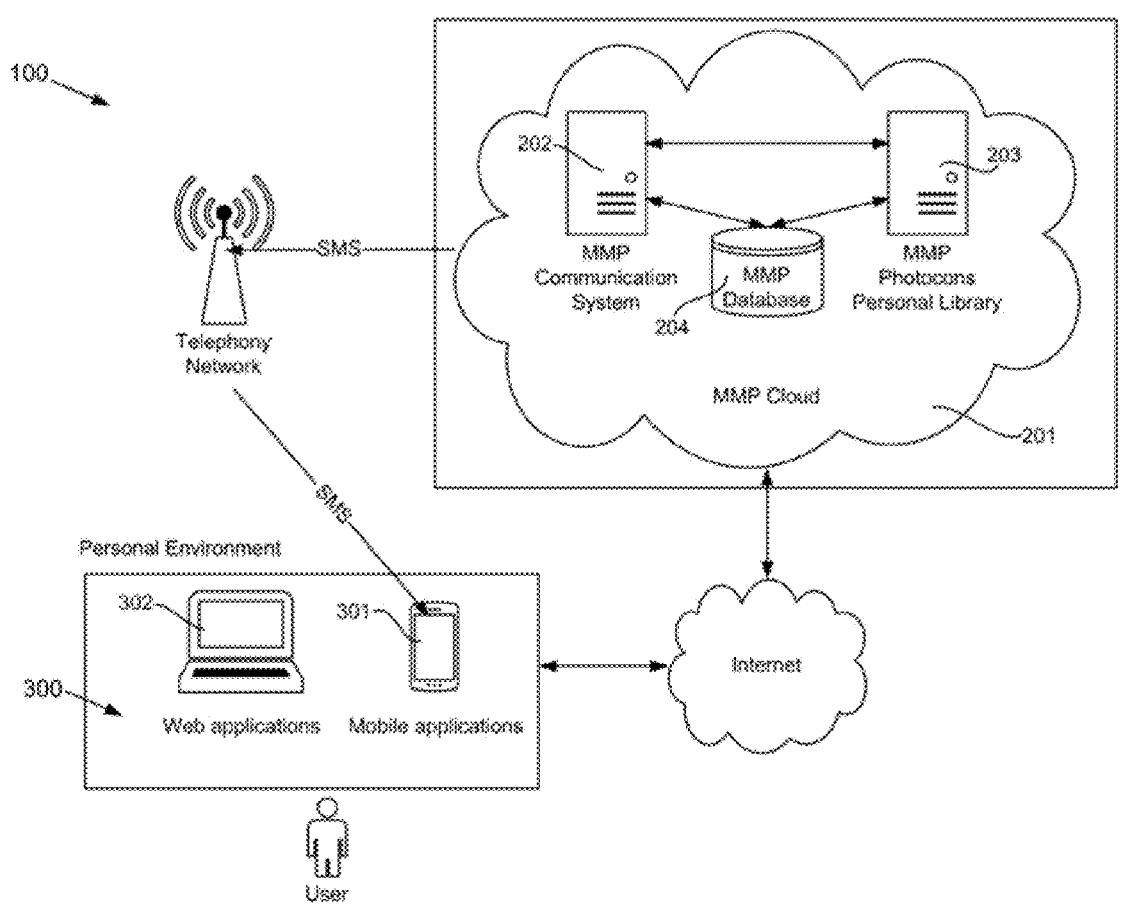
FIG. 1 is a block diagram of an MMP Architecture, according to an embodiment of the invention.

While embodiments are amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

According to embodiments of the invention, MEDIA MESSAGING PLATFORM (MMP) is an alternative Mobile Messaging Communication Service to Short Messaging Service (SMS) and Multimedia Messaging Service (MMS) implemented in such applications like Skype, Microsoft IM, ICQ, Google Chat, etc.

MMP improves social messaging and texting services by increasing information power of communication process between participants by adding "personal" feeling and experience, which should optimize an amount of information per message.

In an embodiment, MMP uses two form of MMP of exchange objects: Messages and Texts. Message is HTML string, which constructed by the Sender using internal HTML format. Receiver will see them in traditional rich web format. Such Message when arrived at Receiver's environment will be properly rendered by Web browser or by MMP Application. Text is a plain string where tags presented as a combination of characters on the Sender's side. On the Receiver's side, these tags would be interpreted and substituted with rich HTML objects (pictures, audio, etc.).

In an embodiment, MMP can operate in two service modes: Interactive Chat and Notification Service. MMP Interactive Chat allows participants to exchange with Messages and Texts while both participants are being online in real time. MMP Notification Service allows sending Texts and Messages without all participants having to be online simultaneously.

MMP can comprise a family of protocols and applications, which allows socially engaged users to include real photographs or another "rich objects" within a text messages without having to "attach" the photo to the text or interrupt user's "texting flow."

Similar to the Emoticon's libraries inserted inside the texting field, the MMP real photos icons (Photocons) are similarly inserted from the personal "emotional" library within the user's texting field. The user can add his/her personalized photos and replace standard Emoticons in MMP User's Photocon Library or alternatively the user can assign additional text symbols, numbers and letters to associated photographs for future "easy insert" in texting field. During the chat session or preparing SMS message in the framework of Notification Service the user can open the MMP Photocon Library and click on a MMP Photocon or, alternatively the user can assign text symbols, numbers and letters to associated photographs.

The assigned symbols, letters or numbers can be typed while texting, resulting in immediate and automatic placement of the associated Photocon where the symbol, number or letter was typed. An example of the uninterrupted "Photocon Placement" within the user texting experience would be the ubiquitous "smiley face" emoticon. For example, the universal "colon symbol" combined with a "right parenthetical symbol" automatically places a "smiley face" emoticon within the user's text message where the combo of these two symbols is typed.

MMP has the universal QWERTY keyboard symbols associated with all existing emoticons, e.g. Smiley, Sad, Angry, Nerd, Heart, Crying, Yawn and so forth. Upon a user's MMP application download to their mobile device, the MMP application can include a library of stock Photocons.

System Architecture

Figure 2:
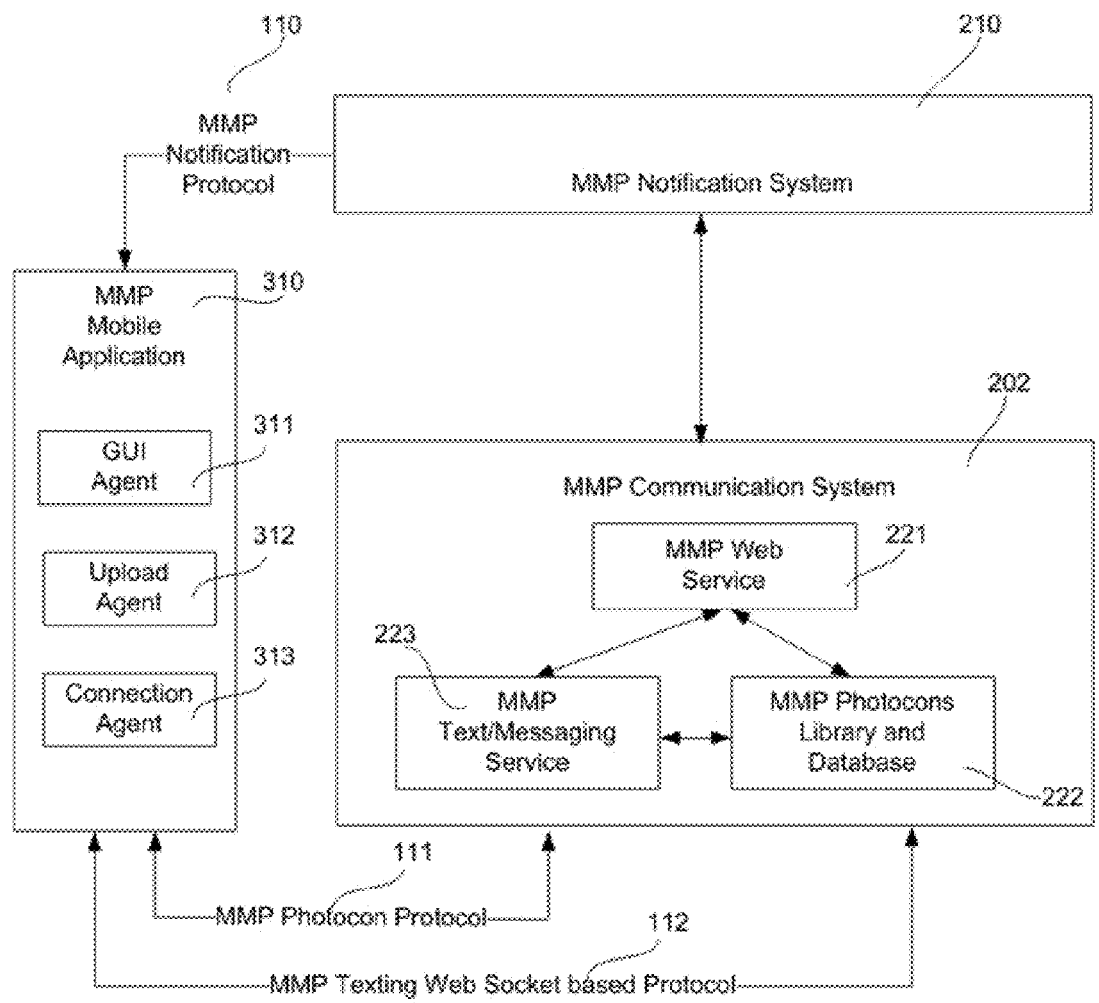
FIG. 2 is a block diagram of an MMP Cloud Architecture, according to an embodiment of the invention.

According to an embodiment, the MMP general architecture 100 incorporates multiple components, applications and environments, as illustrated in FIG. 1. Architecture 100 can include MMP Cloud 201, MMP Communication System 202, and MMP Photocons' Personal Library 203 and further includes MMP Personal Environment 300, which in turn contains Mobile Applications 301 and Web applications 302. An embodiment of the System's Cloud architecture is depicted in FIG. 2. It includes a representation of main MMP components 100 and a representation of the communication protocols 110, 111, 112 between structural elements of MMP System.

MMP Communication System

According to an embodiment, MMP Communication System 202 comprises different modules performing system critical tasks and provides connection and command interpretation received from users' devices 300. In embodiments, system 202 can include MMP Web Service 221, MMP Photocons Library and Database 222 and MMP Text/Messaging Service 223.

MMP Text/Messaging Service

In embodiments, MMP Text/Messaging Service 223 comprises a module configured to handle the Texting/Messaging modality. The interaction can be handled both ways using duplex channels based on MMP Photocon Protocol 111 and HTML5 Web socket texting protocol 112, in an embodiment. The System provides interface and command processor to interpret tags and support interaction with Photocon Library and Database System 222.

MMP Notification System

In embodiments, MMP Notification System 210 provides delivery and notification mechanism to users currently offline using MMP Notification Protocol 110. Notification System 210 checks if a user has subscribed for SMS notification and, if yes, will send SMS and/or e-mail with URL to MMP formatted message. If not, Notification System 210 will periodically check user status and will deliver the message when it is possible. Notification System 210 includes custom alert sounds notification when it is received by a MMP user. A MMP user is able to transmit a photocon to a non-MMP user's mobile phone number using MMP Demo account invitation, in embodiments.

MMP Push Notifications System

In embodiments, MMP Push Notification System combines sound and vibration alerts with specific pictures and automatic actions such as open chat with calling person, show a picture or play an audio or video clip. MMP Mobile Applications 310 installed on mobile device is capable to receive notifications even in a "hibernate" mode. MMP Push Notification System includes protocols, which are capable to send "push notifications" from MMP Text/Messaging Service 223 to MMP Mobile Application 310. The push notification includes ping as one of the variety of notifications, when one of MMP users enters MMP and his/her correspondent is offline (hibernate).

MMP Photocon Library System and Database/MMP Semantic Model

Figure 3:
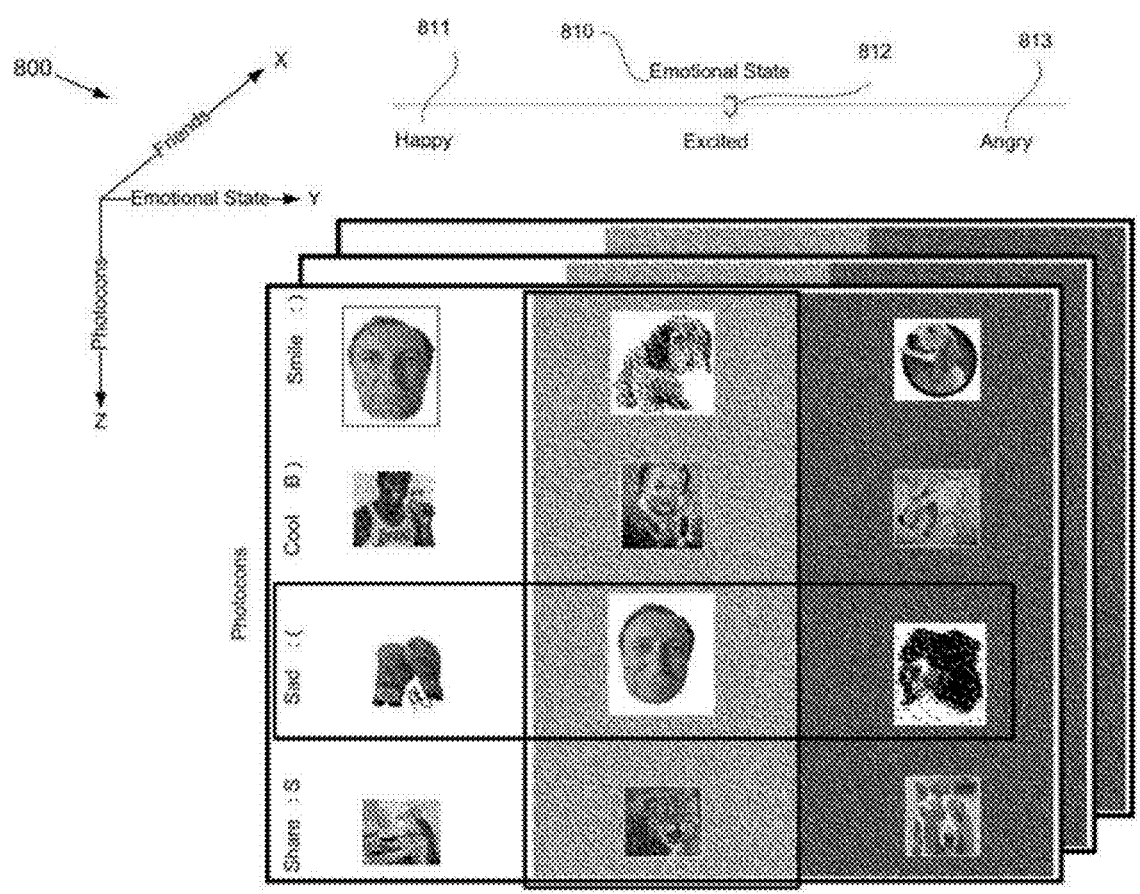
FIG. 3 is an illustration of an MMP Semantic Model, according to an embodiment of the invention.
Figure 10:
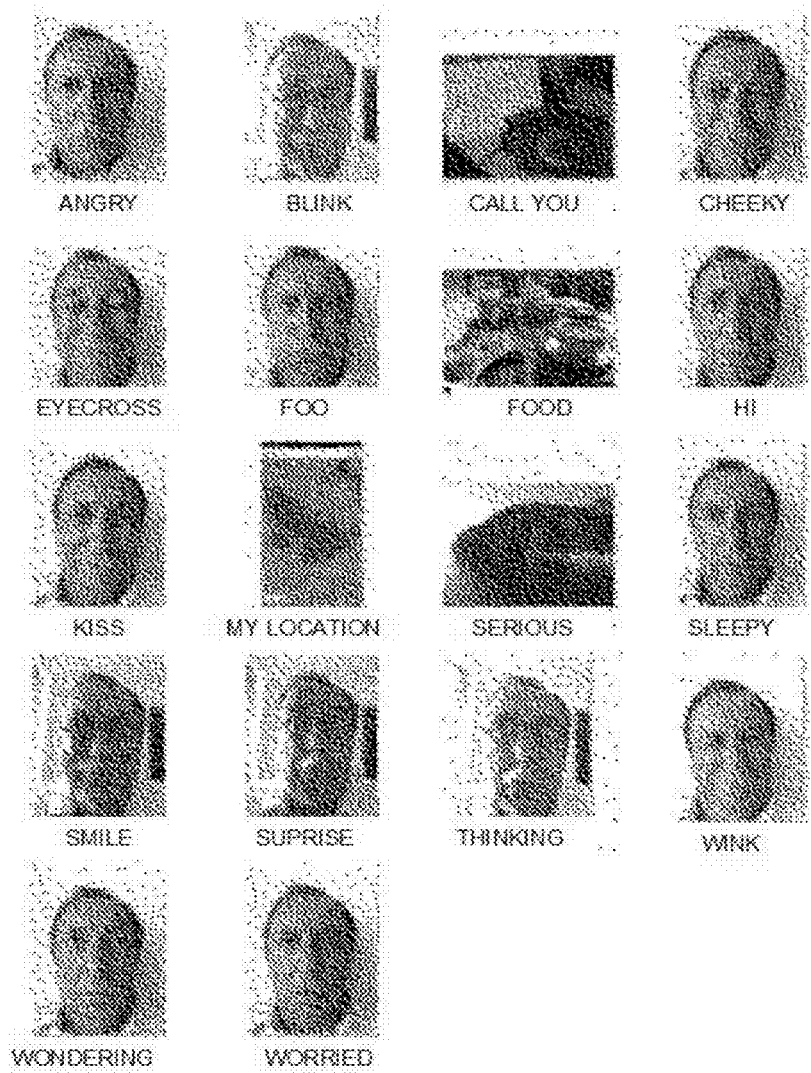
FIG. 10 is an example illustration a photocon library having images and the respective emotional tags, according to an embodiment of the invention.

In embodiments, a Photocon Library 222 is a Cloud Service and Database System based on a MMP Semantic Model illustrated in FIG. 3. See also FIG. 10. This model allows categorizing of Personal Image Library and significantly optimizes the image search during chatting and texting. It provides personal rich media content organization based on multi-dimensional social and emotional content classification, preparing it for seamless integration into mobile messaging, comprising: semantically organized multi-dimensional communication space and multilayer rich content structure; content representation, which associated with every particular contact person in user's contact list, including types of interpersonal relationship (friendship, family, professional, romantic, etc.) and user's current emotional state 810 (Happy 811, Excited 812, Angry 813, etc.).

In an example, consider the following scenario:

Step 1. A user selects the contact for MMP chat session. This selection will automatically select the corresponding layer with a unique set of Photocons.

Step 2. The user is able to define his/her "Emotional State" or "Temperature" for this particular chat by using slider 810 or sequential cyclic color setter for MMP Mobile application. This selection will pick out one particular column (color) on the selected layer: green (Happy 811), yellow (Excited 812) or red (Angry 813).

Step 3. During the dialogue, the user is able to dynamically change the current emotional state 810 of the dialogue and shortcut will select the Photocon from the correspondent column automatically.

In embodiments, a particular substitution of emoticon's symbol instead of the shortcut will depend on the current square of the Semantic Model 800, namely on contacts, dialogue "temperature" and current emotion 810.

MMP Web Service

Figure 4:
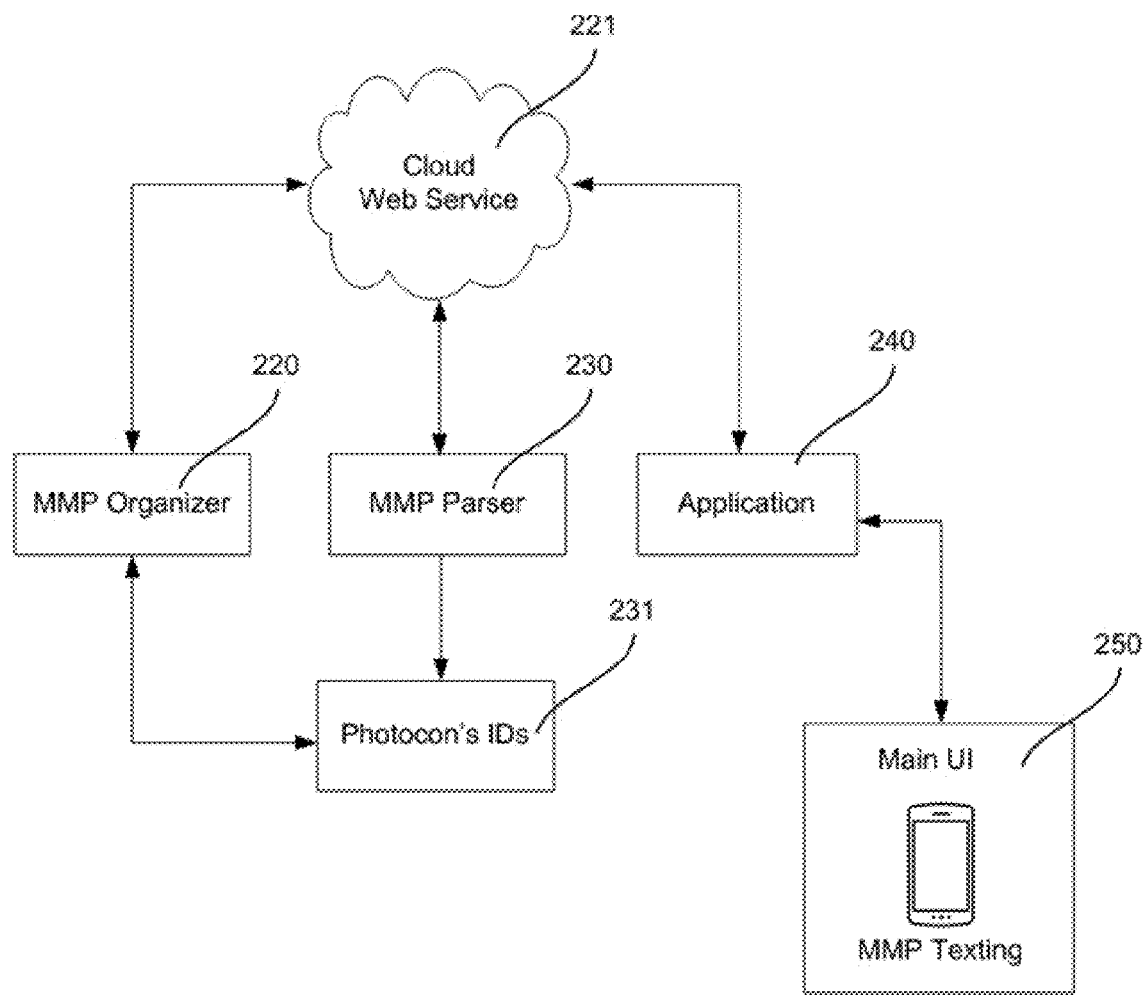
FIG. 4 is a block diagram of components of an MMP architecture, according to an embodiment of the invention.

In embodiments, MMP Cloud Web Service 221 connects users to MMP Photocons Library System 203 and Database 204, and at the same time provides support for the Social Networks content share and other traditional Web services. FIG. 4 illustrates the components of MMP architecture at a system level.

MMP Cloud Web Service 221 integrates different System components such as MMP Organizer 220, MMP Parser 230, MMP Application 240, the Photocon's IDs component 231 and Main UI 250 to organize rich media personal content and to create individual layer for each person from user's contact list.

MMP Parser 230 analyzes text string and substitute MMP shortcuts with appropriate Photocons. MMP Application 240 is a platform dependent implementation of MMP client side functions such as photo transfer, asynchronous push notification and other. Photocons' IDs 231 is a part of MMP Database storing and accessing relations between Photocons and Rich Media Objects. Main UI 250 is client based integration of MMP Web based components and platform dependent applications 240.

Figure 5:
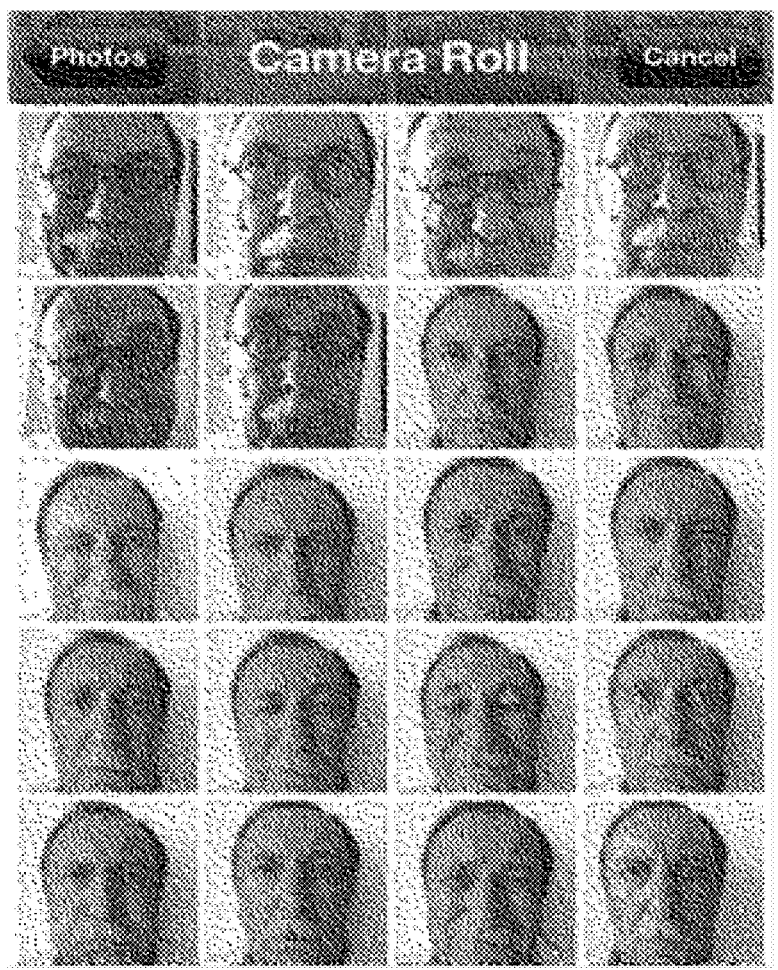
FIG. 5 is an illustration of raw pictures in a picture library, according to an embodiment of the invention.
Figure 6:
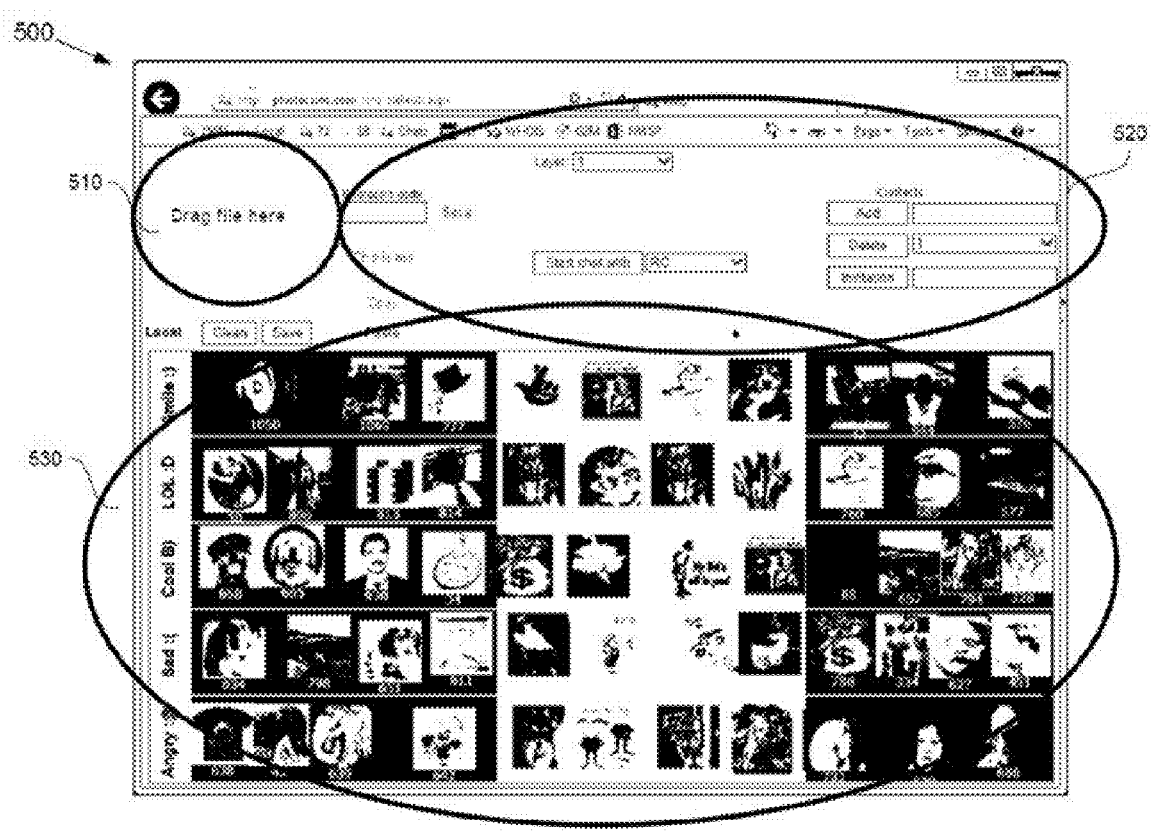
FIG. 6 is an illustration of an MMP Organizer Layout page, according to an embodiment of the invention.

MMP Organizer 220 provides an ability to upload rich content items from the Web, desktop or from a Picture Library, such as that illustrated in FIG. 5 on smartphones or tablets. An example MMP Organizer layout page is illustrated in FIG. 6.

MMP Organizer allows user to collect, classify and rearrange Photocons, as well as to initiate chats and invite others to join MMP. MMP Organizer consists of three functional areas: Selection Area 510, Customization Panel 520 and Photocons Depot 530.

Assigning shortcuts (Photocon Codes) is one of the features of MMP Organizer. User may assign any word or special combination of characters to the particular Photocon and while chatting, use this combination to push Photocon to his/her contact.

MMP Mobile Application

In embodiments, MMP Mobile Application 310 is the client portion of the System. It sends user interactions to the MMP Communication System and provides an ability to edit Messages in rich HTML format, which may include texts, pictures, audio, location, video input, etc. The Client application 310 comprises a GUI Agent 311, Upload Agent 312 and Connection Agent 313 incorporated in a standalone software product. The Connection Agent provides an interface between the GUI Agent and Upload Agent and via the network consequently with the MMP Communication System 202. MMP Application includes Push Notification System, which combines sound and vibration alerts with specific pictures and automatic actions such as open chat with calling person, show a picture or play an audio or video clip. It is capable to receive notifications even in a "hibernate" mode.

Figure 7:
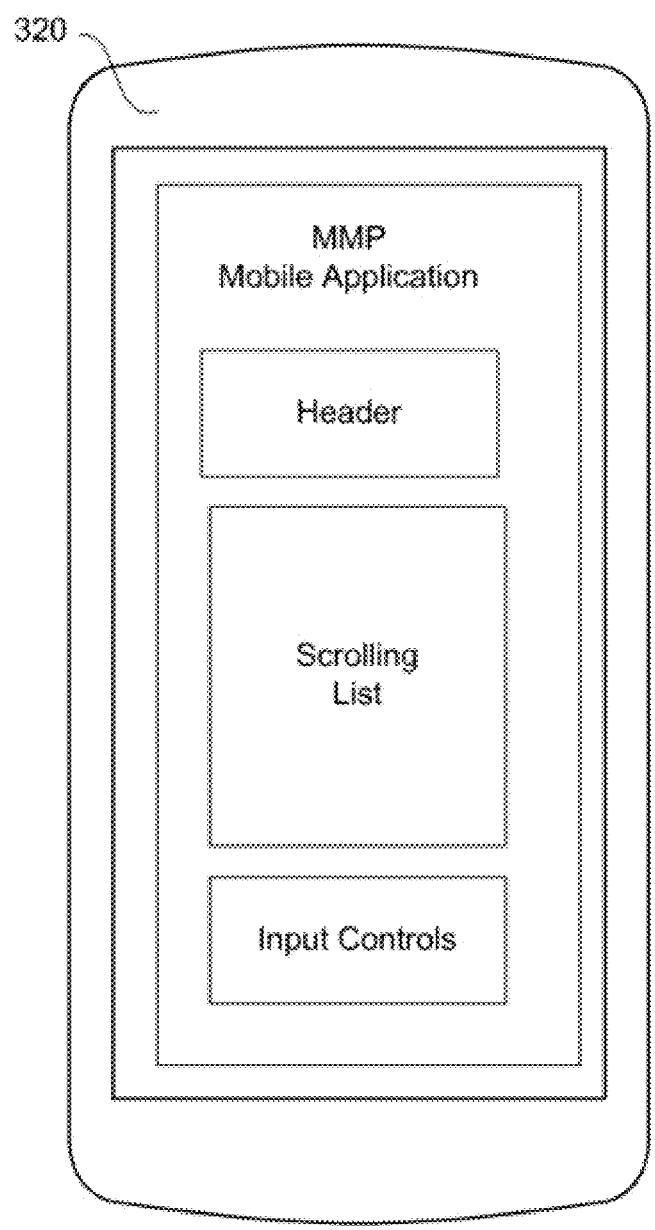
FIG. 7 is a block diagram of the design structure of a mobile MMP application, according to an embodiment of the invention.
Figure 8:
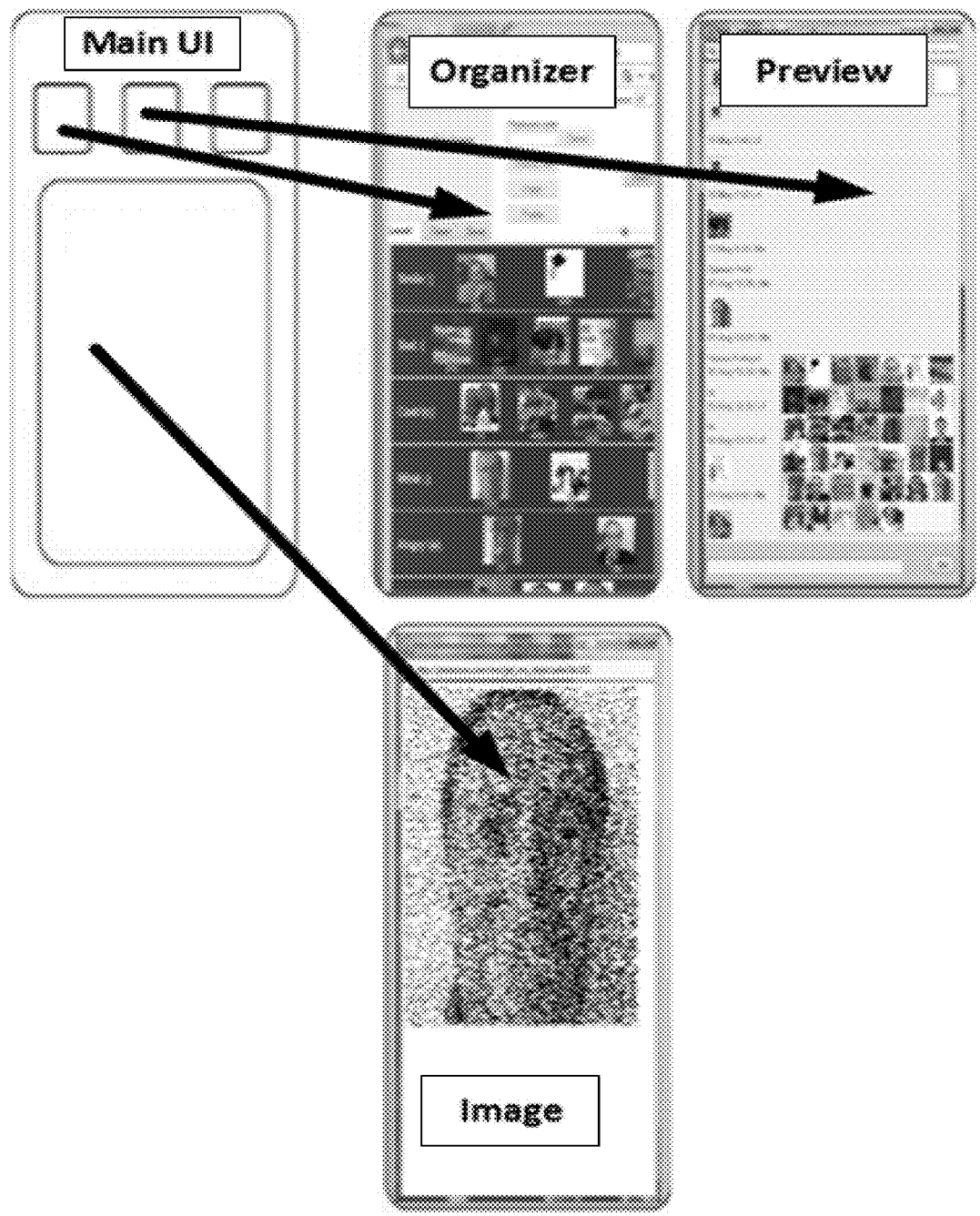
FIG. 8 is a block diagram of generic smartphone views and controls, according to an embodiment of the invention.

The Design Structure 320 of the Mobile MMP Application is illustrated in FIG. 7. In embodiments, client application software specifically is configured for iPhone, Android, Windows, or other platforms. A block diagram of smartphone views and controls is depicted in FIG. 8.

In embodiments, embodiments of the mobile application can run on and be implemented by a wireless device having a processor and memory. The processor can be any programmable device that accepts digital data as input, is configured to process the input according to instructions or algorithms, and provides results as outputs. In an embodiment, the processor can be a central processing unit (CPU) configured to carry out the instructions of a computer program. The processor is therefore configured to perform basic arithmetical, logical, and input/output operations.

The memory can comprise volatile or non-volatile memory as required by the coupled processor to not only provide space to execute the instructions or algorithms, but to provide the space to store the instructions themselves. In embodiments, volatile memory can include random access memory (RAM), dynamic random access memory (DRAM), or static random access memory (SRAM), for example. In embodiments, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the invention.

Information and Communication Flow

According to an embodiment, the information flow based on users' messages is inputs transferred to their respective server components. Server registers where the user has pointed and the CHAT Texting System perform message or text recognition and extracts the essential meaning of it. Next, these inputs are handed over to the Client. To elaborate a response, the CHAT Texting System can query the Photocon Library, perform a lookup in the database and returns the result back to the CHAT System. The result then processed by the CHAT System to create a presentable response to the user. The response is then passed over to the Client.

Figure 9:
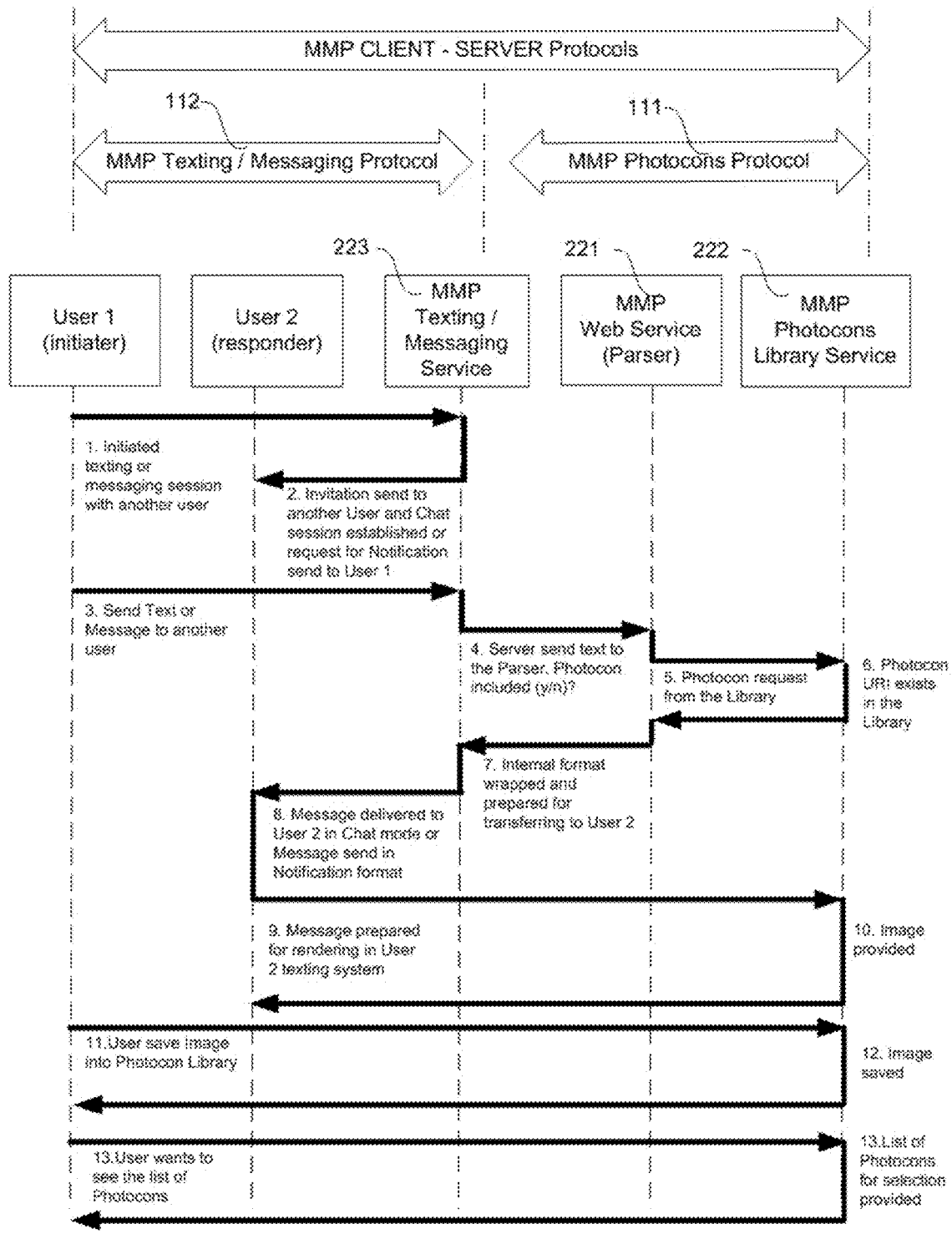
FIG. 9 is a flow diagram of MMP information and communication, according to an embodiment of the invention.

MMP Protocols can define the set of control commands and its flow that manages the users' texting/messaging session. FIG. 9 depicts interaction between users and Photocon Library 222 and the information flow between the modules of the System based on BMP Protocols. It also depicts the architecture of communication and connections between System components. The three major Services are the backbone of MMP system: Web Service 221, Photocons Library (for example, that shown in FIG. 10) and Database Service 222 and Texting/Messaging Service 223.

An interaction between the Users through these major modules 221, 222 and 223 is established and controls by Photocons Protocol 111 and Texting/Messaging Protocol 112, which shown in FIG. 9 and can be illustrated by the following steps and control commands according to the session scenarios:

1. User 1 (initiator) initiates texting/messaging session with User 2 (responder) via module 223.
2. Module 223 sends invitation to User 2 and Chat session is established or request for Notification sent to User 1
3. User 1 sends Text or Message to User 2 via module 223.
4. Module 223 sends text to the Parser of the module 221 with the request: "Photocon included (yes/no?)"
5. Module 221 sends Photocon request to the Library 222.
6. Module 222 checks if Photocon URL exists in the Library (yes/no?) and sends respond to module 223.
7. Module 223 wrapped Photocon into internal format and prepared Photocon for transferring to User 2 (responder).
8. Message delivered to User 2 in Chat mode or Message sent to User 2 in Notification format.
9. Message prepared for rendering in User 2 texting system and sent to module 222.
10. Module 222 provides Image to User 2.
11. User 1 sends request to module 222 to saves Image into Photocon Library.
12. Image saved into Photocon Library by module 222.
13. User 2 requests the Photocon Library 222 to show the list of available Photocons.
14. Module 222 provides User 1 with the List of Photocons available for selection.

MMP Integrated Environment

Figure 11:
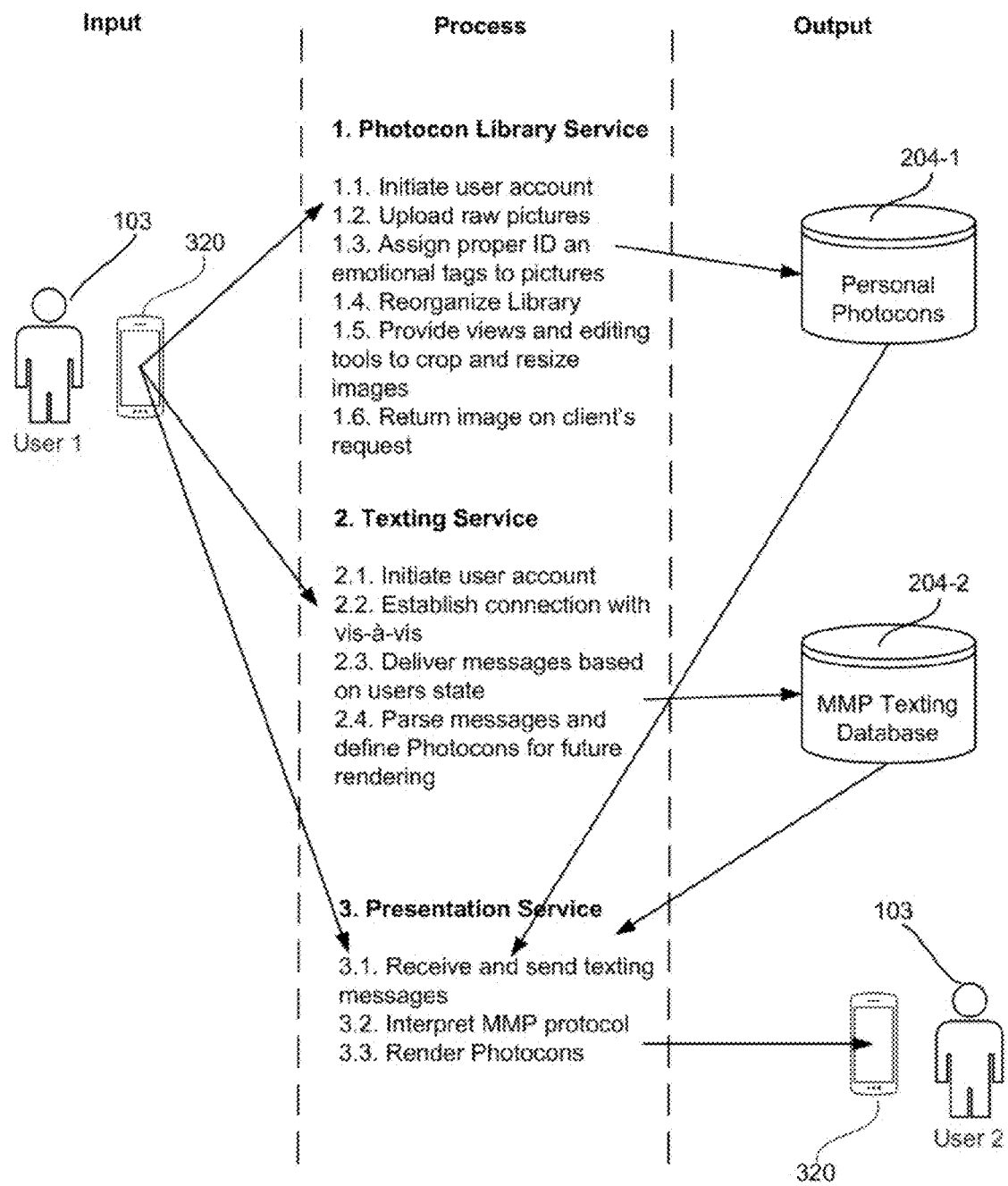
FIG. 11 is a diagram of interaction between MMP users in relation to one or more MMP databases, according to an embodiment of the invention.

In embodiments, MMP Integrated Environment top-level structure consists of three main services: Photocon Library Service, Texting Service and Presentation Service. FIG. 11 depicts a diagram of interaction between MMP users in conjunction with MMP Database 204, including data structures for personalization database 204-1 and structure for texting and messaging database 204-2. As depicted, the interaction can comprise a number of subsections.

In an embodiment, the photocon library service can interface to MMP users 103 via Design Structure 320 and personalization database 204-1. In an embodiment, the photocon library service is configured to, among other processes, initiate a user account, upload raw images, assign proper ID emotional tags to images, organize and reorganize the library, provide views and editing tools to crop and resize images, and return image(s) on the user's request.

In an embodiment, the texting service can interface to MMP users 103 via Design Structure 320 and messaging database 204-2. In an embodiment, the texting service is configured to, among other processes, initiate a user account, establish connections, deliver messages based on a user's state, and parse messages and define photocons for future rendering.

In an embodiment, the presentation service can interface to MMP users 103 via Design Structure 320 and messaging database 204-2. In an embodiment, the presentation service is configured to, among other processes, receive and send texting messages, interpret MMP protocol(s), and render photocons.

Figure 12:
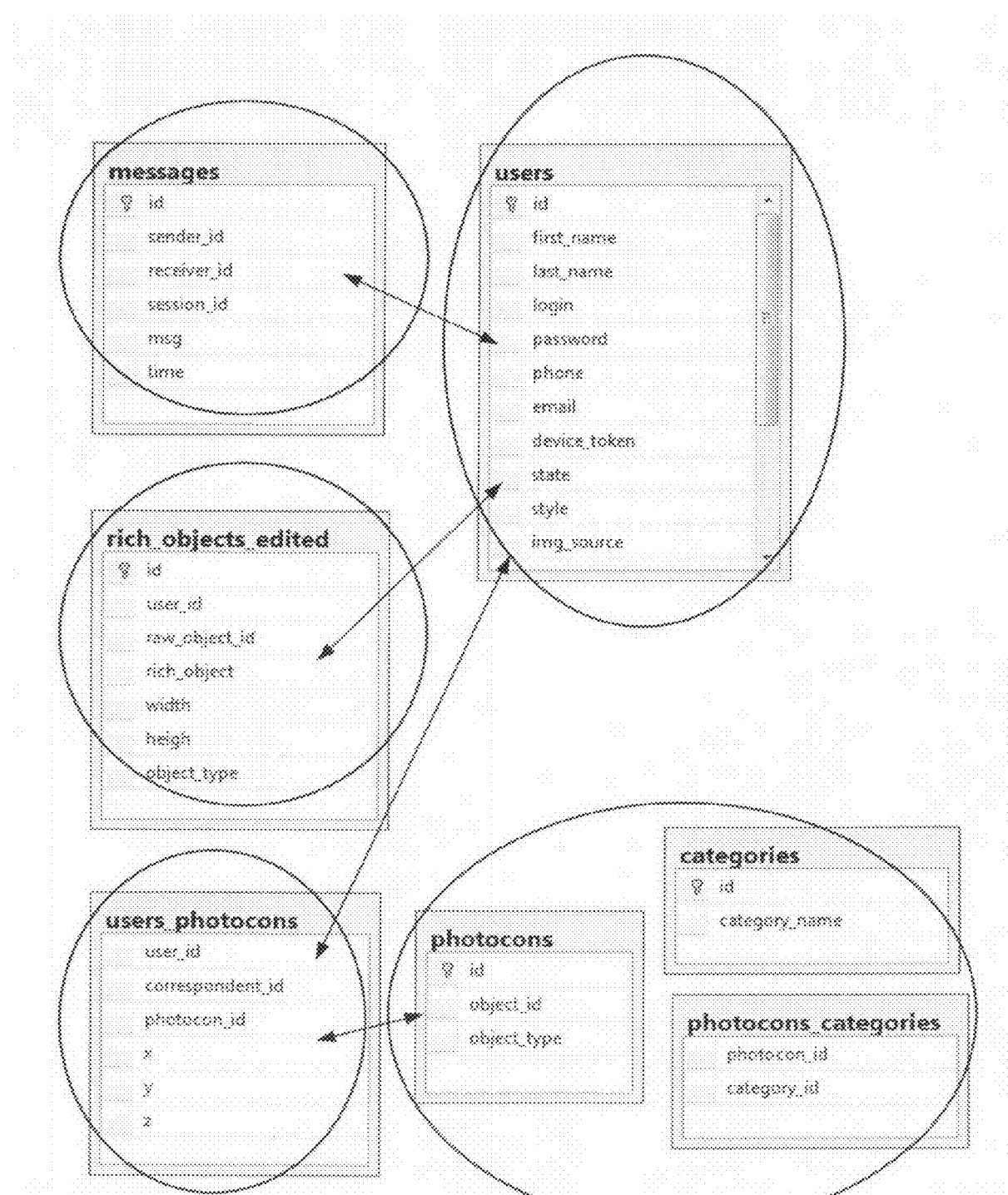
FIG. 12 is an MMP database class diagram, according to an embodiment of the invention.

Referring to FIG. 12, an MMP database 204 class diagram is depicted, according to an embodiment. The class diagram of FIG. 12 illustrates an example implementation of MMP database 204 classes, attributes, operations (or methods), and the relationships among objects. Other implementations are, of course, possible, depending on the environments, devices, services, and other requirements.

Figure 13:
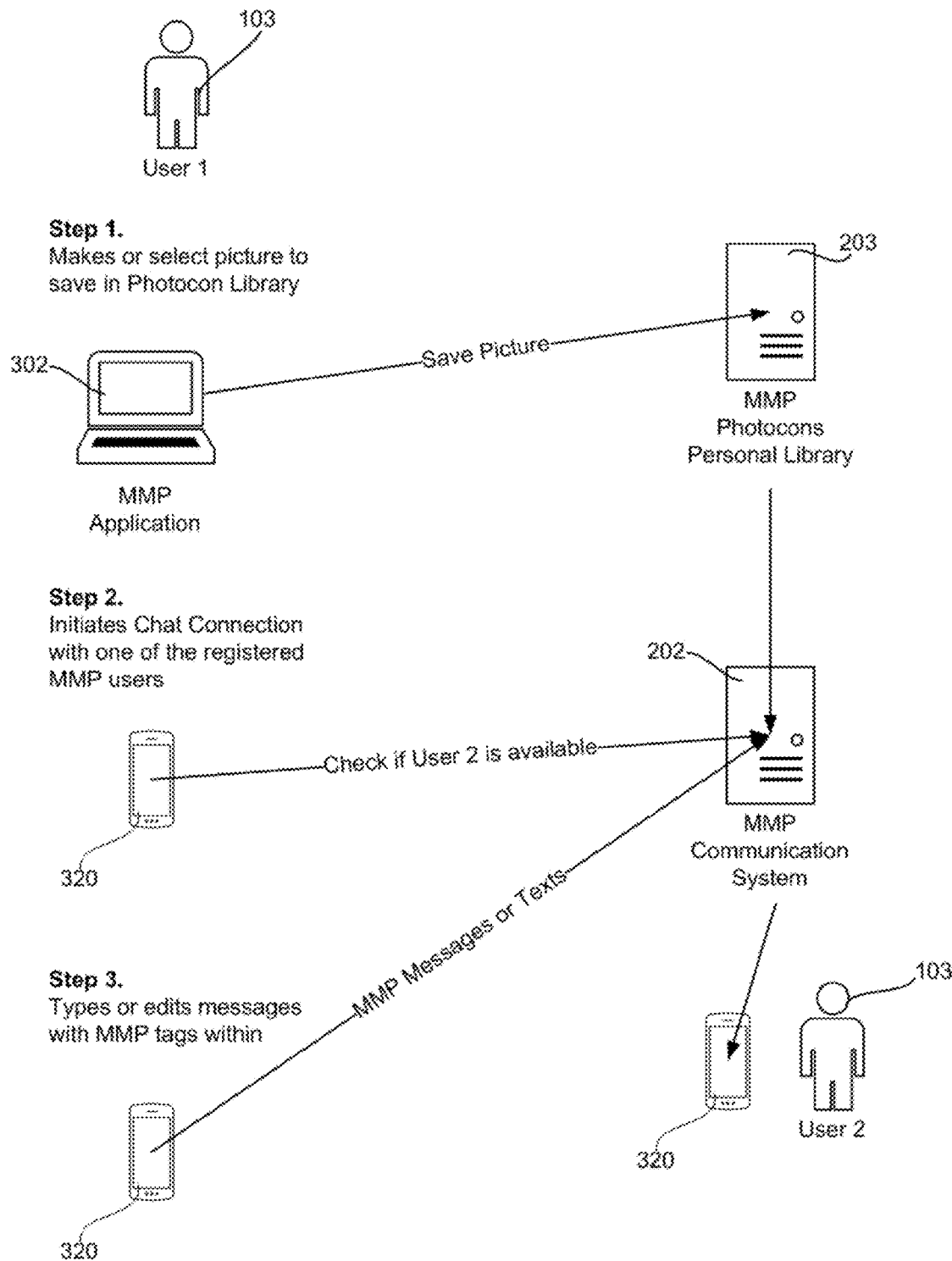
FIG. 13 is a block diagram of interaction between MMP users in relation to Personal Environments and Services, according to an embodiment of the invention.
Figure 14:
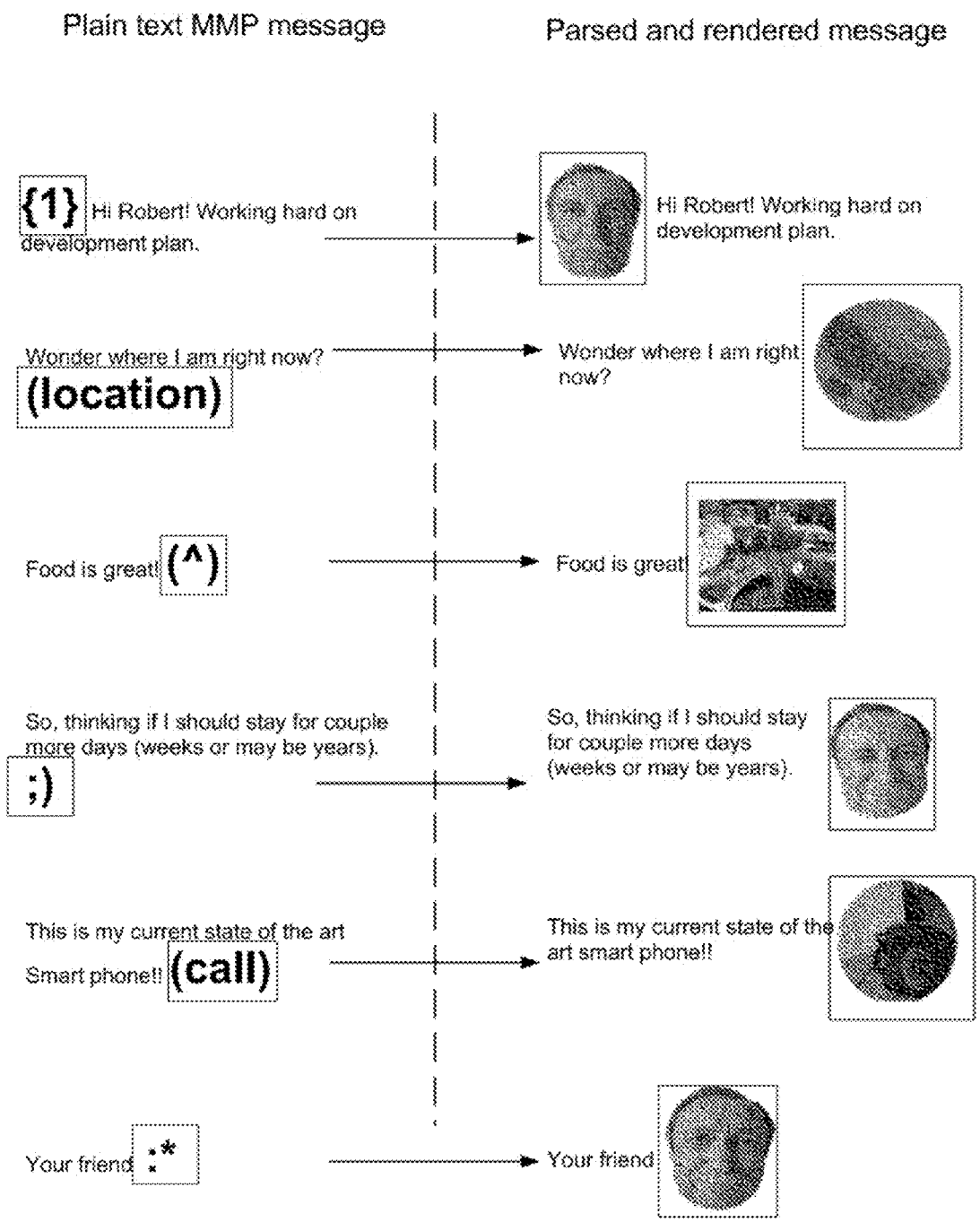
FIG. 14 is a diagram of an example inserting Photocons/ Phojis, according to an embodiment of the invention.

Referring to FIG. 13, particular process and steps during interaction between MMP users 103 in Sender and Receiver mode in conjunction with personal environments (301, 302) and services (202, 203) are shown in an example. In embodiments, in a first step, a first user 103 can make or select a picture to save in a photocon library. In embodiments, this can be done via MMP Application 302 as depicted. In embodiments, the picture or image is saved in MMP Photocons Personal Library 203. In a second step, the user 103 can initiate a chat connection with one of the registered MMP users. For example, using Design Structure 320, a second user 103 is checked to be available via interface to MMP Communication System 202. In a third step, the first user types, edits, or otherwise composes a message with MMP tags within the message. That message is transmitted to MMP Communication System 202, which uses, for example, the picture or image in the photcon library, to insert into the message, which is then transferred to the second user 103 via Design Structure 320. Referring to FIG. 14, an example of the plain text message and subsequent conversion of the parsed and rendered message incorporating Photocons is depicted. In embodiments, Tables 1 and 2 depict example lists of emoticon shortcuts that can be used within the environment to personalize messaging with Photocons.

TABLE 1

| EMOTIONS | STANDARD SHORTCUTS |
|---|---|
| Smile | :) |
| Sad | :( |
| Laugh | :D |
| Cool | (cool) |
| Surprised | :O |
| Wink | ;) |
| Crying | ;( |
| Sweating | (:\| |
| Speechless | :\| |
| Kiss | :* |
| Cheeky | :P |
| Blushing | :$ |
| Wondering | :^) |
| Sleepy | \|-) |
| Dull | \|-( |
| Inlove | (inlove) |
| Evil grin | ]:) |
| Fingers Crossed | (yn) |
| Yawn | (yawn) |
| Puking | (puke) |
| Doh! | (doh) |
| Angry | (angry) |
| It wasn't me! | (wasntme) |
| Party | (party) |
| Worried | (worry) |
| mmmmm . . . | (mm) |
| Nerdy | (nerd) |
| My lips are sealed | :x |
| Hi | (wave) |
| Facepalm | (facepalm) |
| Devil | (devil) |
| Angel | (angel) |
| Envy | (envy) |

TABLE 1-continued

| EMOTIONS | STANDARD SHORTCUTS |
|---|---|
| Wait | (wait) |
| Hug | (hug) |
| Make-up | (makeup) |
| Giggle | (chuckle) |
| Clapping | (clap) |
| Thinking | (think) |
| Bowing | (bow) |
| Rolling on the floor laughing | (rofl) |
| Relieved | (whew) |
| Happy | (happy) |
| Smirking | (smirk) |
| Nodding | (nod) |
| Shake | (shake) |
| Waiting | (waiting) |
| Emo | (emo) |
| Yes | (y) |
| No | (n) |
| Hanshake | (handshake) |
| High five | (highfive) |
| Heart | (heart) |
| Lalala | (lalala) |
| Heidy | (heidy) |
| Flower | (F) |
| Raining | (rain) |
| Sun | (sun) |
| Tumbleweed | (tumbleweed) |
| Music | (music) |
| Bandit | (bandit) |
| Too much information | (tmi) |
| Coffee | (coffee) |
| Pizza | (pi) |
| Cash | (cash) |
| Muscle | (flex) |
| Cake | (^) |
| Beer | (beer) |
| Drink | (d) |
| Dancing | \o/ |
| Ninja | (ninja) |
| Star | (*) |

TABLE 2

| EMOTIONS | MMP SHORTCUTS | STANDARD SHORTCUTS |
|---|---|---|
| ANGRY | {1} | (angry) |
| BLINK | {2} | (blink) |
| CALL YOU | {3} | (call) |
| CHEEKY | {4} | :p |
| DULL | {5} | \|-( |
| EYES CROSS | {6} | (eyes) |
| FOO | {7} | (foo) |
| FOOD | {8} | () |
| HI | {9} | (wave) |
| INLOVE | {10} | (heart) |
| KISS | {11} | :* |
| MY LOCATION | {12} | (location) |
| NATURE | {13} | (nature) |
| SERIOUS | {14} | (serious) |
| SLEEPY | {15} | \|-) |
| SMILE | {16} | :) |
| SURPRISE | {17} | :O |
| THINKING | {18} | (think) |
| WINK | {19} | ;) |
| WINK2 | {20} | (wink) |
| WONDERING | {21} | :^) |
| WORRIED | {22} | :\| |

Various embodiments of systems, devices, and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the invention.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

The invention claimed is:

1. A communications system comprising:
a first user device presenting a first user interface;
a second user device presenting a second user interface;
a messaging cloud including:
at least one database of rich media data, and a semantic model, the semantic model configured to:
categorize a personalized image library based on contact data and emotional state data;
receive a contact data input from the first user device;
receive an emotional state data input from the first user device; and
automatically select an image for insertion into a message from a plurality of images in the personalized image library based on the received contact data and received emotional state data, and
wherein the database is a Media Messaging Platform,
a messaging service configured to:
receive a message, the message including a rich media data request from the first user device,
retrieve the requested rich media data from the at least one database of rich media data, insert the retrieved rich media data into the message while maintaining text flow, and
present the message to the second user device via the second user interface; and
a network operably coupling the first user device, the second user device, and the messaging cloud,
wherein the message is originally formatted on the first user device via the first user interface such that the rich media data request is within the message.

2. The communications system of claim 1, wherein the messaging cloud further comprises a parser configured to analyze the message for a shortcut key, the shortcut key representative of a request for rich media data.

3. The communications system of claim 1, wherein the rich media data request is included within the message by at least one of tapping, clicking, dragging, or typing of a shortcut key on the first user interface.

4. The communications system of claim 1, wherein the message is at least one of an email message, text message, Internet-based instant message, or other network-transmitted message.

5. The communications system of claim 4, wherein the first user device and the second user device are respectively at least one of a mobile phone, a pager, a personal digital assistant (PDA), a tablet, a laptop computer, or a desktop computer.

6. The communications system of claim 1, further comprising a messaging notification subsystem configured to evaluate a status of second user device and present the message to the second user device when the second user device is online.

7. The communications system of claim 6, wherein the messaging notification subsystem is further configured to push the message to the second user device when the second user device is offline.

8. The communications system of claim 1, further comprising an image library organizer configured to:
upload the rich media data to the at least one database of rich media data; and
assign shortcut keys to rich media data.

9. The communications system of claim 1, wherein each of the plurality of images has a relation to a shortcut key.

10. A method of streamlined media insertion on an electronic device, the method comprising:
initiating, by the electronic device, a messaging session with a receiving user device;
receiving a message on the electronic device, the message including at least one media insertion request;
evaluating the at least one media insertion request at a messaging cloud, the messaging cloud including a Media Messaging Platform;
retrieving media from at least one Media Messaging Platform database of media based on the evaluated at least one media insertion request, said database of media including a personalized image library and a semantic model, the semantic model configured to:
categorize the personalized image library based on contact data and emotional state data;
receive a contact data input from the electronic device;
receive an emotional state data input from the electronic device; and
automatically select an image for insertion into the message from the plurality of images in the personalized image library based on the received contact data and received emotional state data, and
inserting the retrieved media into the message while maintaining text flow;
presenting the message to the receiving user device via a receiving user interface, wherein a network operably couples the electronic device, the receiving user device, and the messaging cloud, and the message session formatted on the electronic device such that the rich media data request is within the message.

11. The method of streamlined media insertion of claim 10, wherein receiving the message on the electronic device comprises receiving a string of text, the string of text including a shortcut key as the at least one media insertion request.

12. The method of streamlined media insertion of claim 10, wherein the at least one media insertion request is included within the message by at least one of tapping, clicking, dragging, or typing of a shortcut key on the electronic device.

13. The method of streamlined media insertion of claim 10, wherein the message is at least one of an email message, text message, Internet-based instant message, or other network-transmitted message.

\* \* \* \* \*

(12) INTER PARTES REVIEW CERTIFICATE (3937th)
United States Patent
Coatta et al.

(10) Number: US 9,565,149 K1
(45) Certificate Issued: Mar. 14, 2025

(54) MEDIA MESSAGING METHODS, SYSTEMS, AND DEVICES

(71) Applicants: Jay David Coatta; John Mikkelsen; Sergey Tolkachev; Robert Freidson; Max Freidson

(72) Inventors: Jay David Coatta; John Mikkelsen; Sergey Tolkachev; Robert Freidson; Max Freidson

(73) Assignee: PHOJI, LLC

Trial Number:

IPR2022-00210 filed Nov. 19, 2021

Inter Partes Review Certificate for:

Patent No.: 9,565,149
Issued: Feb. 7, 2017
Appl. No.: 14/072,418
Filed: Nov. 5, 2013

The results of IPR2022-00210 are reflected in this inter partes review certificate under 35 U.S.C. 318(b).

INTER PARTES REVIEW CERTIFICATE
U.S. Patent 9,565,149 K1
Trial No. IPR2022-00210
Certificate Issued Mar. 14, 2025

AS A RESULT OF THE INTER PARTES REVIEW PROCEEDING, IT HAS BEEN DETERMINED THAT:

Claims 1-13 are cancelled.

\* \* \* \* \*